March 10, 1936.  P. R. SMITH  2,033,656
METHOD AND APPARATUS FOR PRODUCING SURFACING MATERIAL
Filed Jan. 18, 1932  4 Sheets-Sheet 1

INVENTOR
Preston R. Smith
BY
Busser + Harding
ATTORNEYS.

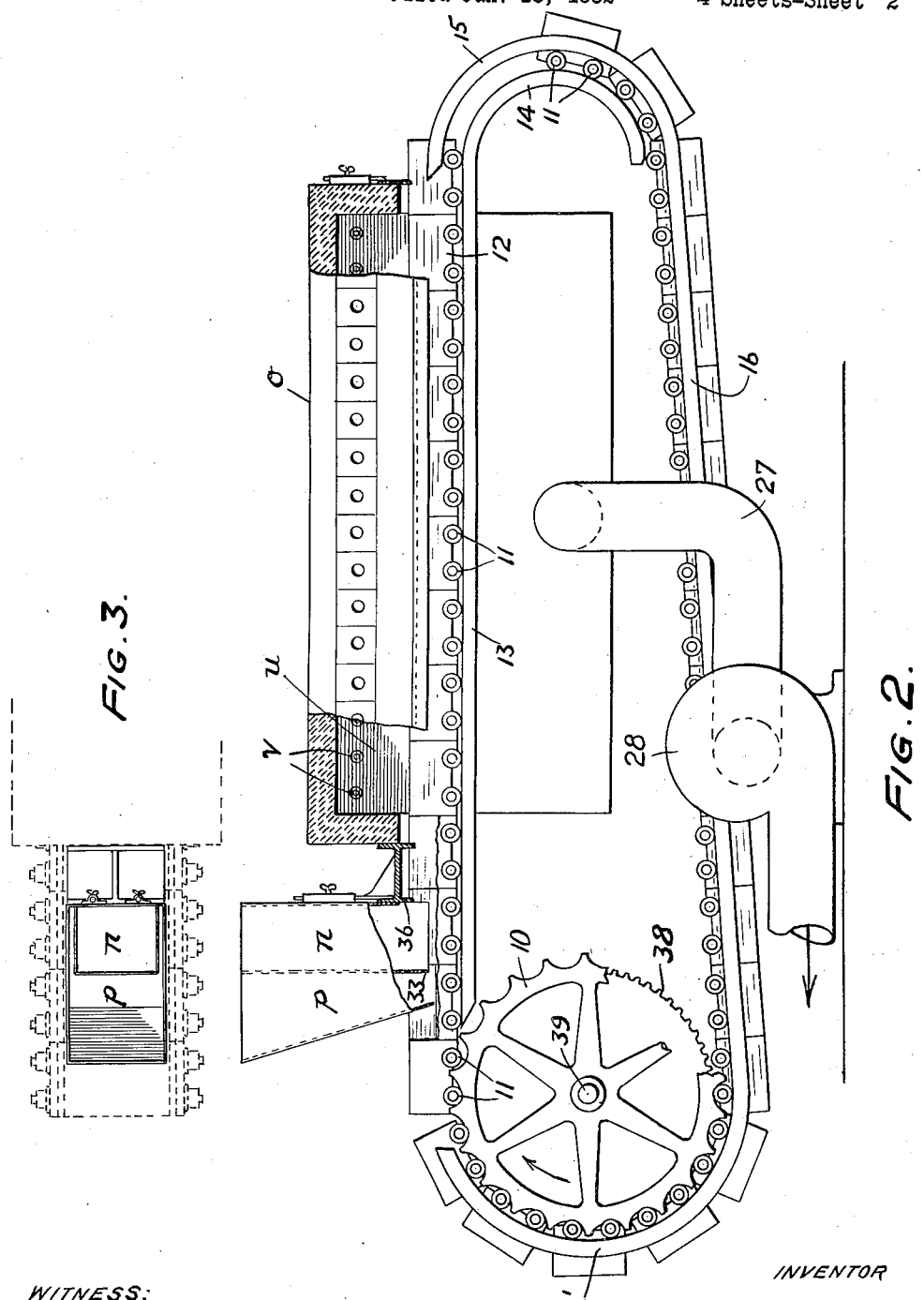

March 10, 1936.  P. R. SMITH  2,033,656
METHOD AND APPARATUS FOR PRODUCING SURFACING MATERIAL
Filed Jan. 18, 1932  4 Sheets-Sheet 4
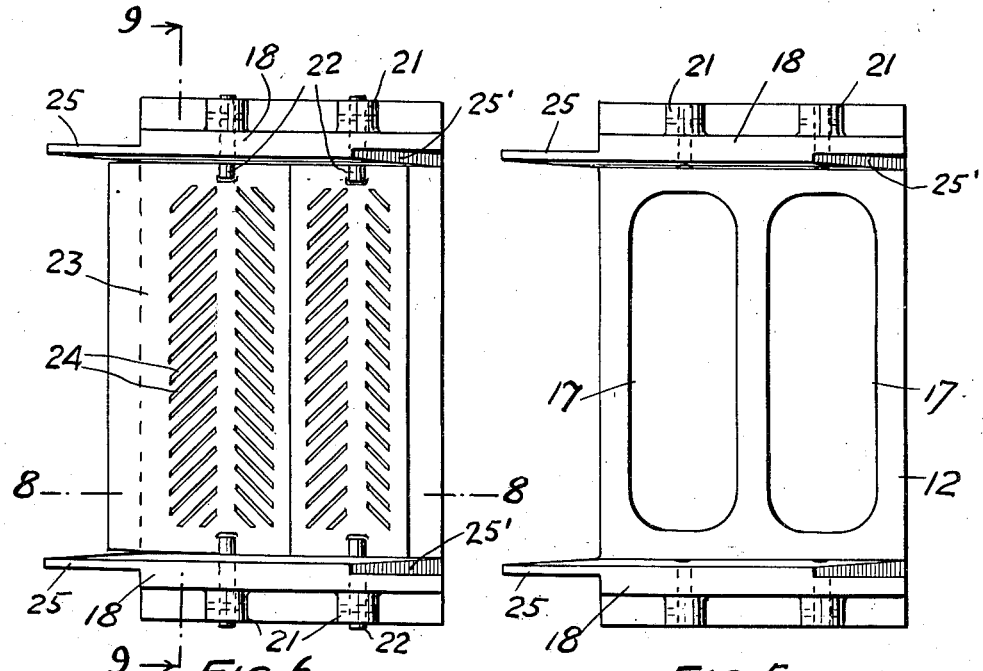
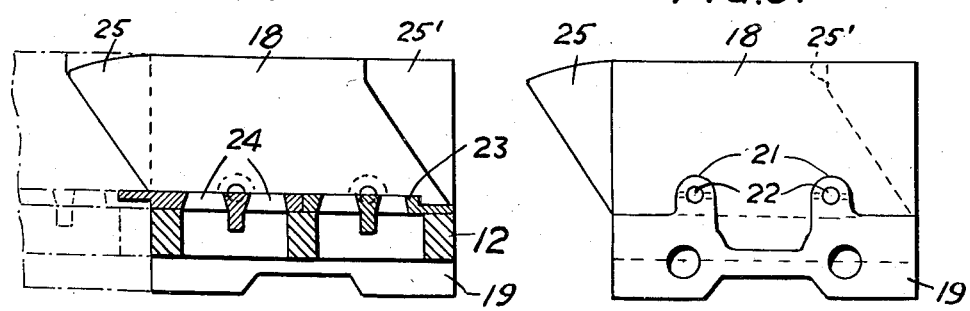
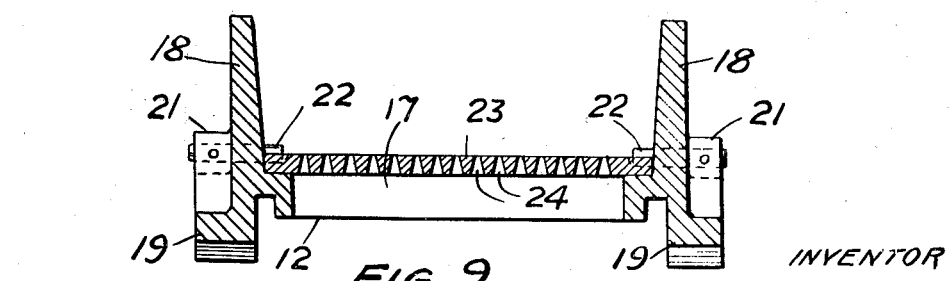

Patented Mar. 10, 1936

2,033,656

UNITED STATES PATENT OFFICE 2,033,656

METHOD AND APPARATUS FOR PRODUCING SURFACING MATERIAL

Preston R. Smith, Rahway, N. J., assignor, by mesne assignments, to Central Commercial Company, a corporation of Illinois Application January 18, 1932, Serial No. 587,378

15 Claims. (Cl. 91—70)

This invention relates to a method and apparatus for producing surfacing material and, more particularly, for producing surfacing material in the form of granules coated with a fused glaze.

Heretofore it has been known to produce granular surfacing material for a variety of uses such, for example, as for use as a surfacing in connection with plastic material, as on walls, as a surfacing material for roofing in the form of shingles or strips formed from bituminously impregnated and coated felt, etc., etc. Such granular surfacing material comprises a base coated with a fused glaze which may or may not be colored. Various materials have been used as the base, though such materials are usually of a refractory nature in order to withstand the temperature necessary for fusing a glaze thereon. Thus, for example, various minerals, rocks, vitrified material, etc., etc. have been used for the base. The glaze has been formed by the application to the base of a raw glaze or a fritted glaze and firing. Various raw glazes have been used, the components being in solution or in suspension in a vehicle enabling their application to the granular base material. However, such usually comprise a flux and a pigment and also include, where the base is silica-free, the necessary silica.

Now, it is the object of this invention to provide a method and apparatus for the production of granular surfacing material of the type contemplated by this invention in a simple and economic manner.

The method embodying this invention involves generally speaking the application of a predetermined quantity of raw glaze in a vehicle to a predetermined quantity of granular base material, mixing the glaze and base material to insure a complete coating of the granular material with the glaze, drying to eliminate the vehicle and firing of the glaze. Subsequent to the firing the product will be cooled and, if desired, may be screened or otherwise treated.

More particularly, the method embodying this invention involves the firing of the glaze coated granular material without agitation and on a body of inert refractory granular material, which may be surfacing material provided in accordance with this invention, or other material capable of withstanding high temperature. The bed material will desirably be of a larger size than the material to be fired in order that it may be readily separated from the newly fired material and fed back for reuse.

More particularly, the method embodying this invention contemplates a continuous procedure and one by which economy of heat may be effected. Thus, the method in accordance with this invention contemplates the continuous passage of granular material coated with raw glaze through a drying zone with continuous feed of treated material to and from a firing zone, waste heat from the firing zone being utilized to effect the drying and bed material being separated from the newly fired material discharged from the firing zone and fed back for reuse.

The apparatus in accordance with this invention involves, as will be more readily understood from the following description and by reference to the accompanying drawings, a novel combination whereby the method in accordance with the invention may be carried out. Further, certain of the elements will be found to involve novel features promoting the efficiency and economy of the apparatus as a whole.

In connection with the practical adaptation of this invention, it will be understood that no particular form of apparatus is necessary, though the apparatus embodying this invention that will be hereinafter described may be desirably utilized. It will be further understood that the method in accordance with this invention is independent of the use of any particular type of granular base material and of any particular raw or fritted glaze, the method being adaptable to the production of surfacing material with the use of any suitable base material and glaze.

Having indicated in a general way the nature and purpose of this invention, I will proceed to a detailed description of a preferred embodiment thereof, it being noted that the details of the carrying out of the method embodying the invention will be described in connection with the operation of the preferered embodiment of the apparatus embodying the invention, which will be described with reference to the accompanying drawings, in which:

Figure 2 is a fragmentary view, partly in section, showing a detail of the kiln shown in Figure 1.

Figure 3 is a plan view showing a detail of the combination shown in Figure 2.

Figure 5 is a plan view of an element of the conveyor shown in Figure 2.

Figure 6 is a plan view showing pallets in position on the element of the conveyor shown in Figure 5.

Figure 7 is an end view of the subject of Figure 5.

Figure 8 is a sectional view on line 8, 8, Figure 6.

Figure 9 is a sectional view on line 9, 9, Figure 6.

Figure 1:
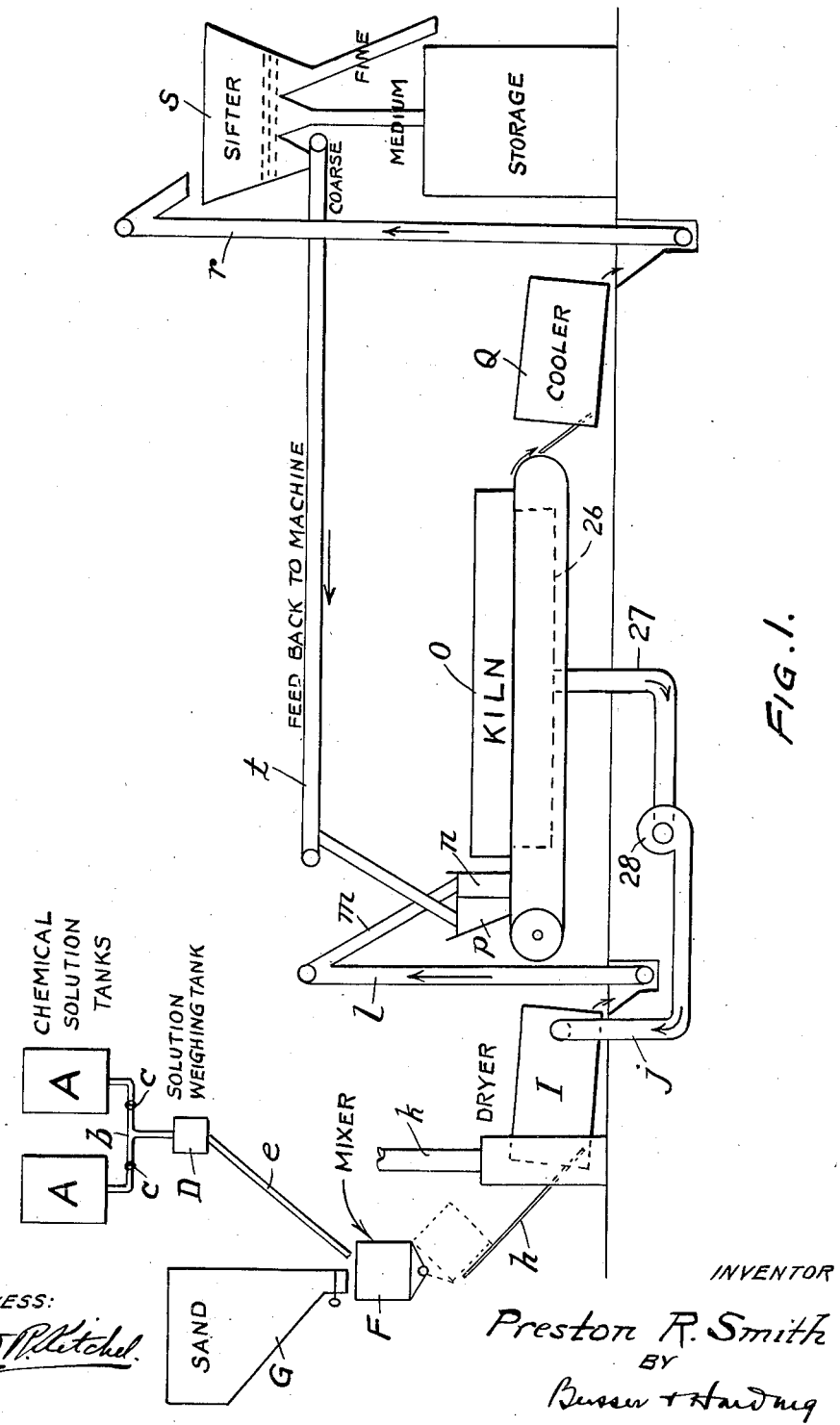
Figure 1 is a schematic view of a preferred form of apparatus embodying this invention and adaptable for the carrying out of the method embodying this invention.

With reference more particularly to Figure 1, A, A indicate storage tanks for raw glaze, the tanks being connected to a weighing tank D, and being provided with valves c whereby discharge from the tanks respectively may be controlled. A pipe or conduit e is adapted to connect the weighing tank to a mixer F. G indicates a storage for granular base material, the storage being arranged to discharge through a suitably valved conduit or chute into the mixer F. The mixer F may be, for example, of the barrel type or may be provided with any suitably driven mixing device in order to effect thorough mixing of the glazed granular base material so that the granular base material will be completely coated with glaze.

The mixer F may be provided with any suitable form of discharge opening or may be made to tilt as indicated in the drawings. The mixer will discharge into a conduit h by which the glaze coated granular material will be carried to a drier I.

The drier I may be, for example, of cylindrical form and arranged to be rotated, the inlet end of the drier being elevated in order that the material will travel therethrough. The drier may be heated by any suitable means, but desirably will be heated by means of waste heat from the kiln o in which the glaze is fired and which will be hereinafter described. The waste gases from the kiln may be discharged into the drier through a conduit j and will pass out of the drier through a suitable flue k.

The dried granular glaze coated material passing from the drier will be picked up by an elevator l, which may, for example, be a bucket elevator, and will be discharged therefrom into a suitable conduit m through which it will pass into a feed hopper n in communication with the kiln o. Surrounding three sides of the feed hopper n is a feed hopper p from which bed material will be fed to the kiln ahead of the granular glaze coated material to be fired therein, all as will be more fully described in detail in connection with detailed description of the kiln hereinafter.

The material discharged from the kiln will comprise the fired product; i. e. granular material coated with a fused glaze, and the bed material. The discharged material will be desirably cooled in a cooler Q, which may be of any suitable construction and the cooled material discharged therefrom will be carried by an elevator r, and discharged into a sifter or sieving apparatus S, in which the bed material, which, as has been indicated, will desirably be of larger size than the granular surfacing material produced, will be separated from the product. The product, for example, separated into two or more sizes, will be discharged from the sifter S to storage, while the bed material will be fed back through a suitable conduit t to the bed material hopper p.

With reference, more particularly, to Figures 2–9, the kiln will comprise a combustion chamber u suitably lined with refractory material, into which from opposite sides are let a series of burners v. The burners, adapted to burn a mixture of air and gas, will be supplied with the mixture by virtue of their connection to headers w, w on opposite sides of the furnace. The headers are supplied through one or a series of pipes x connected with a mixing device y including a Venturi section z. The mixing device is supplied with air through a pipe 1 and with gas through a pipe 2. The supply of air and gas through the pipes 1 and 2 respectively, is controlled by means of a controller 3 into which air is led from a main 4 through a pipe 5 and gas is led from a main 6 through a pipe 7. The supply controller, which may be of any suitable construction, is in turn controlled through a thermal control device 8, actuated by a thermopile 9 positioned in the combustion chamber. It will be understood that the supply of air and gas to the burners v will be controlled by the temperature in the combustion chamber in order that a proper and substantially uniform temperature may be maintained throughout the firing of the glaze on the granular base material.

The granular base material coated with raw glaze, which, as has been indicated, is fed into the kiln through the feed hopper n, is carried through the kiln beneath the combustion chamber on pallets supported on conveyor elements 12. The conveyor elements 12 travel about and are driven by means of a pair of sprockets 10 positioned adjacent the front of the kiln and the teeth of which engage with rollers 11 carried by the respective elements 12, which are independent from one another, and which collectively form a conveyor. The conveyor elements are supported in their passage through the kiln by means of tracks 13 on opposite sides of the kiln and upon which the rollers 11 bear. At the rear or discharge end of the kiln the tracks 13 are curved downwardly and backwardly, as shown at 14. Tracks 16, which are inclined, serve to support the conveyor elements. The tracks 16 also have upwardly and backwardly curved end portions 15 conforming to the curved end portions 14 of the tracks 13, adapted to engage with the rollers 11 and support the conveyor elements after the rollers in the travel of the conveyor leave the downwardly and backwardly curved end portions of the tracks 13. The tracks 16 are provided with curved portions 16' which conform to the sprockets 10 and retain the rollers 11 of the conveyor elements 12 in engagement with the teeth of the sprockets.

As will be observed, the conveyor elements are advanced by the sprockets 10 through being in contact with each other in their travel from the sprockets along the tracks 13 and that they travel by gravity from the downwardly curved end portions 14 of the tracks 13 back to the sprockets on the tracks 16. The conveyor elements of the tracks 13 are separated by a space from those on tracks 16, so that as the conveyor elements successively pass down from the tracks 13 to the tracks 16, they will receive a jar on striking the conveyor element which previously left the tracks 13 to facilitate discharge of the fired granules and bed material.

The elements 12 of the conveyor, which are shown in detail in Figures 5–9, are, for example, castings having apertures 17, having upwardly extending flanges 18 and dependent flanges 19. The rollers 11 are mounted on pins 20 extending from the dependent flanges 19, while apertured bosses 21 are provided for the entry of pins 22, adapted to maintain the pallets 23 in place as the conveyor elements are reversed for return or repassage through the kiln. The pallets 23 may be castings and are provided with apertures 24, which may be in the form of a herringbone arrangement, for example, as shown in Figure 6. The apertures 24 of the pallets overlie the apertures 17 in the conveyor elements. The pallets are provided in their upper surfaces at their ends with grooves for the reception of the ends of pins 22 which extend into the bosses 21 on the conveyor elements and the pins serve to hold the pallets down on the conveyor elements. The adjacent edges of the pallets supported on a conveyor element are plain, while their opposite edges are rabbeted so that as the conveyor elements pass along the tracks 13 the pallets of adjacent conveyor elements will partially overlie one another and form a tight joint between the pallets of adjacent conveyor elements. If desired, the side flanges 18 of adjacent conveyor elements may be provided at their ends alternately with triangular wings 25, and corresponding recesses 25'. The triangular wings overlapping into adjacent recesses, when the conveyor elements are, for example, traveling on tracks 13 and the wings as they pull out of the recesses 25' when the conveyor elements successively leave tracks 13 afford a guard for the fired granular material.

Beneath the conveyor elements as they pass beneath the combustion chamber $v$ is positioned a box 26 to which, through a conduit 27, is connected a suction fan 28, which discharges into conduit $j$. The suction fan draws products of combustion and heat from the combustion chamber down through the raw glaze coated granular material carried by the conveyor elements whereby the glaze on the granular material is fired. The waste heat discharged by the fan 28 is, as has been heretofore indicated, discharged into the drier and therein serves the purpose of drying or eliminating the vehicle from the glaze coated on to the granular base.

The conveyor elements are formed on their under side with grooves 29 into which the upper edges of the box 26 extend, the edges of the box being packed with suitable packing material 30 in order to avoid loss of heat. Similarly, at the bottom of the combustion chamber are provided inwardly extending flanges 31 provided with grooves 32 on their under sides, in which the upper portions of the upwardly extending flanges 18 on the conveyor elements run, thus avoiding the loss of heat or air leakage.

The feed hoppers $n$ and $p$, as more particularly shown in Figures 2 and 3, are positioned adjacent the inlet end of the kiln. The hopper $p$, as it will be noted from Figure 3, is placed in front of the hopper $n$ and extends along the sides of hopper $n$ so that as the conveyor elements are passed beneath the hopper, they first receive a charge of bed material which, as has been indicated, is fed into hopper $p$. The bed material, except at the edges, is leveled off by the lower edge 33 of the front wall of hopper $n$. The conveyor elements then receive a charge of raw glaze coated material to be fired, it being noted that since the hopper $p$ extends along the sides of the hopper $n$, bed material will be fed to the edge portions of the conveyor elements. The raw glaze coated granular material to be fired fed from the hopper $n$ will be leveled off by the edge 36, which is adjustable.

Figure 4:
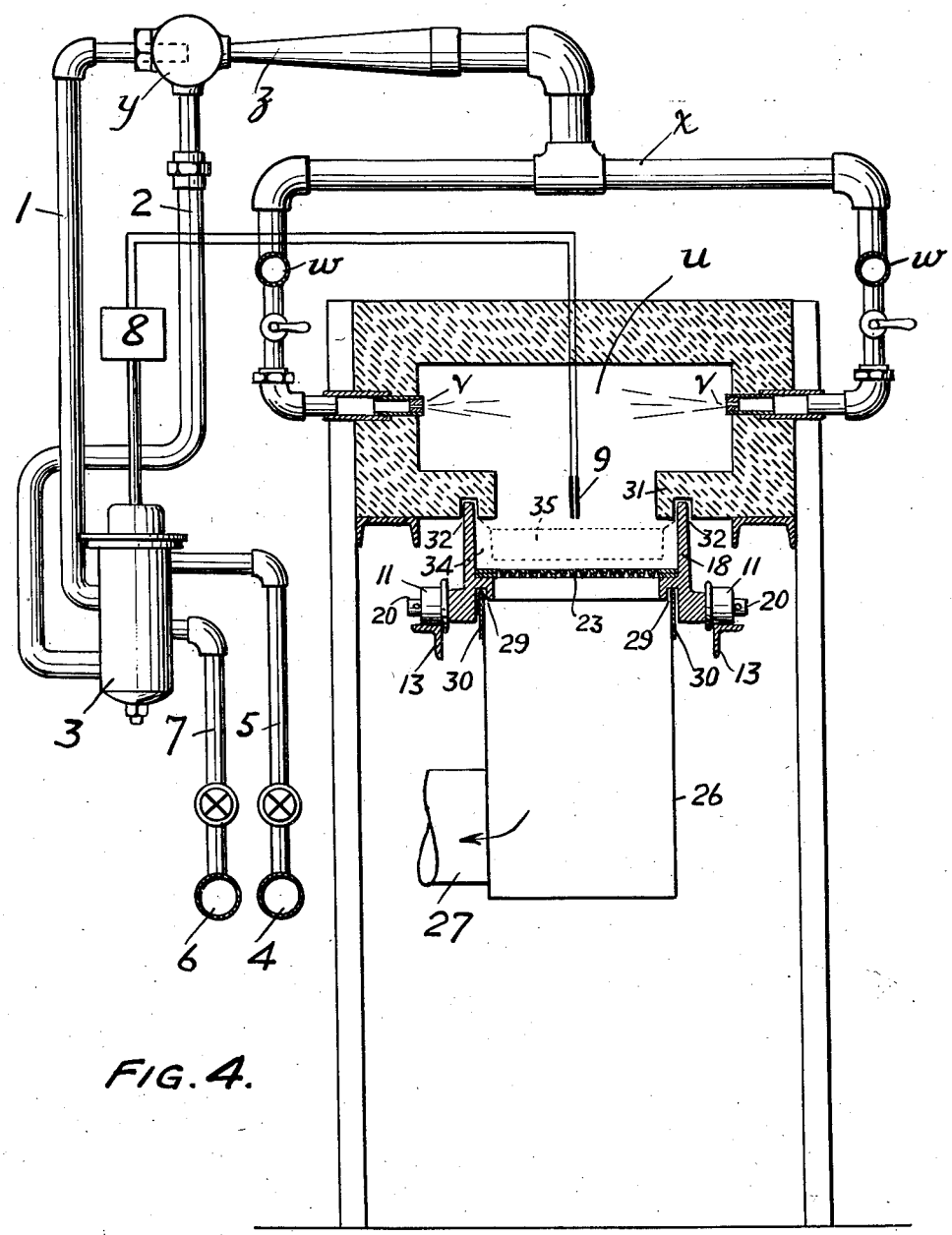
Figure 4 is a cross sectional view showing details of construction of the kiln shown in Figure 1.

The arrangement of the bed and granular material to be fired will be noted from an inspection of Figure 4, in which the bed material is indicated at 34 and the granular material is indicated at 35. The bed material fed at the edges of the conveyor elements during the feeding of the granular material to be fired will extend above the material to be fired and will act to seal against air leakage, groove 32 in the inwardly extending flange 31 in the combustion chamber and in which the edges of the flanges 18 of the conveyor elements run.

In carrying out the method in accordance with this invention using, for example, the apparatus described above, it will be understood that the granular base material may be of any desired kind, and the raw glaze may likewise be of any desired composition or may, if desired, be a fritted glaze.

As illustrative, the base material may, for example, be a natural refractory material, as for example, mineral material or rock which may or may not contain silica, or the material may be a vitrified material; likewise the base may be porous or nonporous. Thus, for example, the base material may be quartzite, mica schist, ganister, ceramic material (as ceramic waste), sand, feldspar, etc., etc.

The base material may desirably have a more or less rough surface, which will facilitate adherence of the glaze thereto when fused. The raw glaze, as has been indicated, may be of various composition; but, generally speaking, will contain a flux and also silica where the base is of a non-siliceous character. Where a siliceous base is used, silica may be omitted from the glaze in whole or in part, depending upon the particular base. The glaze will also include suitable pigmenting material, the precise nature of which will depend upon the desire for color and the particular color desired. The components of the glaze will be carried in a vehicle, either in solution or suspension, in order to facilitate application to the granular base material. As has been indicated, where desired a fritted glaze may be used, and where used such will be carried in suspension in a vehicle for application to the base material.

As illustrative of suitable base material and raw glaze for the production, for example, of granules in accordance with United States Letters Patent No. 1,831,784, November 10, 1931, to George H. Brown, the base may be a refractory siliceous mineral material, as, for example quartzite, and the glaze may comprise a crystallizable alkali metal salt, as, for example, sodium nitrate, sodium carbonate, or the like, in solution in water. If color is desired in the glaze, as, for example, green, copper sulphate may be included in the glaze, or for blue cobalt nitrate may be included, or for brown manganese chloride may be included.

As illustrative of a suitable base material and raw glaze for the production of, for example, granular surfacing material in accordance with, for example, United States Letters Patent No. 1,831,469, November 10, 1931, to Arthur W. Sewall, the base material may comprise ground ceramic waste, as, for example, the vitrified waste produced in the manufacture of sanitary porcelain, wall and floor tile, electric insulators, etc. The waste will be crushed and screened and the granules of the size of (say) about 0.1 inch in diameter, being separated and forming the base material. The raw glaze may comprise, for example, a flux, silica and any suitable metal or metallic salt, to give the desired color and a vehicle to facilitate coating of the glaze on the base material.

As further illustrative of raw glaze which may be used with any suitable base in the production of granular surfacing material in accordance with the method embodying this invention, for example, satisfactory raw glazes are disclosed in the application for United States Letters Patent of Preston R. Smith, Ser. No. 476,933, filed August 21, 1930, and in the application for United States Letters Patent of Preston R. Smith, Ser. No. 476,934, filed August 21, 1930, in which are disclosed, respectively, glaze compositions adapted for application to non-porous refractory base material, the ingredients of the glaze being carried in suspension or solution in a vehicle, and to a porous refractory base material, the ingredients of the glaze being carried in suspension in a vehicle. In said Smith applications various fluxes are given, as, for example, litharge, calcium fluoride, cryolite, white lead, red lead, zinc oxide, calcium carbonate, magnesium oxide, etc., etc. In the case of glazes adapted to be in solution in a vehicle, fluxes, as, for example, sodium nitrate, sodium carbonate, aluminum sulphate, borax, sodium silicate, etc., etc., are indicated. As pigments are disclosed, for example, cadmium sulfide-selenium mixtures, cobalt oxide, chromium oxide, etc., etc. The inclusion of silica is indicated where base does not contain the necessary silica, the silica being added to the glaze, for example, by the addition of silica dust, feldspar, or the like. The vehicle is indicated as water or any suitable solvent for the ingredients of the glaze which may be readily eliminated, as, for example, where the glaze is desired to be in solution in the vehicle; and the vehicle is indicated as water, turpentine and various oils, which may be readily eliminated as by heating, etc. where the ingredients of the glaze are desired to be wholly or partly in suspension in the vehicle.

In carrying out the method in accordance with this invention for the production of granular surfacing material comprising a refractory base having a coating of glaze fused thereon, the modus operandi will be substantially the same with various base materials and raw glazes, including fritted glaze. In proceeding, for example, using sand as a base and as the glaze a solution of 7 pounds iron sulphate, 1 pound potassium dichromate, 10 pounds borax, dissolved in 100 pounds of water, the raw glaze solution will be added to an amount of sand, say 865 pounds, so that the grains of sand will be thoroughly coated or wetted with the glaze solution without, however, the presence of any substantial excess of the solution.

The preparation of the solution may be effected in the tanks A, A and a measured quantity of the glaze solution, in proportion to a measured quantity of sand, may be effected in the solution weighing tank d from which it will be discharged into the mixer F into which a measured quantity of sand from the supply G will be discharged. The glaze solution and sand are mixed in the mixer F so that the grains of sand are coated with the solution.

The coated grains of sand are then subjected to heat to effect elimination of the vehicle. In the illustrative case, the coated sand may be subjected to a temperature of (say) 165° F. for elimination of the water from the glaze solution with deposit of the raw glaze as a coating on the sand.

The drying of the coated sand may be effected in the dryer E which, as has been indicated, receives waste heat from the kiln O and into which the sand coated with the glaze solution is discharged from the mixer F as by dumping or tipping the mixer for discharge of the coated sand into the chute or conduit h by which it is carried into the dryer.

The coated sand having been dried, or in other words, the vehicle carrying the raw glaze having been evaporated off, the sand with coating of raw glaze is discharged from the dryer and subjected to firing to fuse the raw glaze with the formation of coating of fused glaze on the grains of sand. The firing of the glaze in the illustrative case will desirably be at a temperature of about 1,750° F., it being understood that the temperature used in any given case will depend upon the nature of the raw glaze and, in any event, will be sufficiently high to fuse the glaze for the formation of a glass. In the illustrative case, when the glaze is fired, the silica for the formation of a glass will be drawn from the base material or sand which contains silica.

For the firing of the raw glaze coated granules, they will, after discharge from the dryer, be raised by the elevator l and discharged through the conduit m into the feed hopper n from which they will be fed onto the pallets 23 on successive conveyor elements 12, which will be continuously advanced into and through the kiln o by means of sprockets 10 which will be suitably driven as by gear 38 mounted on shaft 39 on which the sprockets are mounted.

The feed hopper p will be charged with a bed material which may be any suitable refractory material in granular form. The bed material may be, for example, previously prepared and fired granular surfacing material of larger size than the material supplied to hopper n. The bed material in hopper p will be fed to the pallets 23 ahead of the material fed from hopper n, so that the material fed from hopper n will be fed onto a bed of previously fed bed material. The bed material will extend over the bottom of the pallets and upwardly at the edges thereof between the body of material fed from hopper n, due to the arrangement of the hoppers, as described in connection with Figure 3 and as shown in Figure 4.

Prior to the passage of glaze coated granular material to be fired through the kiln o, the burners v will have been lit and the kiln brought up to firing temperature. As the conveyor elements 12 are advanced, carrying the material to be fired through the kiln beneath the combustion chamber, as shown in Figure 4, the suction fan 28 will be operated and will draw the heat from the combustion chamber down through the material to be fired and through the bed material and through the apertures in the pallets and conveyor elements 12 into air-box 26, from which the fan will withdraw the waste heat and discharge it into the dryer for the drying of further glaze coated sand. The drawing of the heat from the combustion chamber down through the glaze coated granular material to be fired will result in fusing the glaze onto the granular material. The desired temperature in the combustion chamber will be automatically maintained substantially constant by virtue of the control exercised through the thermopile positioned in the combustion chamber at a point just above the surface of the granules to be fired. It will be understood that a number of thermopiles may be positioned in the kiln at different points throughout its length.

The leaking of air into the path of the heat from the combustion chamber down through the granules to be fired is avoided by virtue of the extension of the side flanges 18 of the conveyor elements 12 into the slots 32 formed in the flanges 31 extending into the bottom of the combustion chamber, which slots are sealed by the upper extension of the bed material between the body of the granular material to be fired and the flanges 18. Leakage of air into the air-box is avoided by the extension of its edges into grooves 29 formed in the under side of the conveyor elements 12 which are packed by the packing 30.

The conveyor elements bearing the granules to be fired are, as has been indicated, continuously advanced through the kiln at a rate such that the glaze will be desirably fused to the base granules as the conveyor elements respectively leave the kiln at the end opposite to that at which the feed hoppers are placed. In the firing of the granules, that is to say their passage through the kiln, they are not substantially agitated, it being desirable that the granules be quiescent during the firing, except for their steady advance through the kiln.

When the conveyor elements successively leave the kiln, they fall from the tracks 13 to the tracks 16, as clearly shown in Figure 2. As the conveyor elements successively fall from the tracks 13 to the tracks 16, the fired granules and bed material carried on the pallets are discharged from the conveyor elements, and the discharge is facilitated by the fact that the conveyor elements falling from the tracks 13 strike a previously fallen conveyor element which jars loose any material on the pallets tending to stick thereon. The material discharged from the pallets may be caught in a chute and pased into a cooler Q. The fired granules, i. e. the granules the glaze on which has been fused, may be somewhat caked due to slight adherence of the granules together. However, the cake will be found to readily break up, or, in other words, the individual granules will readily separate. On discharge from the cooler which may, as has been indicated, be of any suitable structure, the granules and bed material will be carried to a sifter, which may be any suitable screening device, for the purpose of separating the newly fired granules or product from the bed material. As has been indicated, the bed material will be suitably fed back to the hopper p for reuse as bed material in the firing of further glaze coated sand. The newly fired granules may be merely separated from the bed material and discharged to storage, or they may be separated into sizes in the sifter or screening apparatus and discharged therefrom separately as medium and fine granules.

It will now be observed that, in accordance with the method embodying this invention, suitable refractory base material is coated with any suitable raw glaze carried in a vehicle, the base material and glaze being so proportionate as to avoid any substantial excess of glaze. The coated base material is then dried, or, in other words, the vehicle is eliminated and the glaze coated base material is fired by continuous passage through a firing zone, the heat being drawn through the glaze coated base material, agitation of the glaze coated base material being avoided during the firing.

It will be further observed that, in accordance with this invention, there is provided an apparatus whereby a granular surfacing material of the type contemplated may be produced with facility and economy. The apparatus, it will be observed, will comprise means for proportioning and admixing the base material and raw glaze, for drying the glaze coated base material or eliminating the vehicle which carries the glaze, the drying means being associated with a kiln for firing the glaze coated granules on a bed material in such manner that the heat for drying the granules will be supplied from waste heat from the kiln. The kiln will be provided with means for feeding bed material and granules to be fired, and means will be provided for separating the bed material from the fired granules and for feeding back the bed material for reuse. In connection with the kiln, means will be provided for maintaining a substantially uniform temperature, and conveying means will be provided for continuously passing granules to be fired through the kiln or firing zone.

It will be understood that the method, in accordance with this invention, is not dependent on the use of any particular granular base material nor upon the use of any particular glaze and that various modifications in the procedure herein described, by way of illustration, may be made without departing from the scope of this invention. Further, it will be understood that the apparatus described herein is illustrative only of a preferred improvement of this invention insofar as it relates to the apparatus, various modifications of the apparatus, as described, being contemplated as within the scope of this invention.

I have not claimed herein the apparatus illustrated and described, as such forms the subject matter of an application for United States Letters Patent, Serial No. 653,824, filed January 27, 1933, by me as a division hereof.

What I claim and desire to protect by Letters Patent is:

1. The method of producing granular surfacing material which includes coating a granular base material with a vehicle carrying a glaze, removing the vehicle and firing the glaze coated base material to fuse the glaze thereon while subjecting the base material to movement without agitation.

2. The method of producing granular surfacing material which includes coating a granular base material with a vehicle carrying a glaze, removing the vehicle and firing the glaze coated base material to fuse the glaze thereon on a bed of granular refractory material without agitation.

3. The method of producing granular surfacing material which includes coating a granular base material with a vehicle carrying a glaze, removing the vehicle and drawing heat through a mass of the glaze coated material without substantial disturbance of the mass to fuse the glaze thereon.

4. The method of producing granular surfacing material which includes coating a granular base material with a vehicle carrying a glaze, removing the vehicle and passing a mass of the glaze coated material through a heating zone without agitation to fuse the glaze thereon.

5. The method of producing granular surfacing material which includes coating a granular base material with a vehicle carrying a glaze, removing the vehicle and passing a mass of the glaze coated material through a heating zone without agitation to fuse the glaze thereon while drawing heat through the mass.

6. The method of producing granular surfacing material which includes coating a granular base material with a vehicle carrying a glaze, removing the vehicle and passing a mass of the glaze coated material on a bed of granular refractory material through a heating zone without agitation to fuse the glaze thereon.

7. The method of producing granular surfacing material which includes coating a granular base material with a vehicle carrying a glaze, removing the vehicle, firing the glaze coated base material to fuse the glaze thereon on a bed of granular refractory material without agitation and separating the refractory bed material from the fused glaze coated base material.

8. The method of producing granular surfacing material which includes admixing a quantity of a granular base material with a vehicle carrying a glaze in quantity not substantially in excess of that necessary to coat the base material, heating the coated base material to eliminate the vehicle and firing the coated base material without substantial disturbance of the mass to fuse the glaze thereon.

9. The method of producing granular surfacing material which includes admixing a quantity of a granular base material with a vehicle carrying a glaze in quantity not substantially in excess of that necessary to coat the base material, heating the coated base material to eliminate the vehicle and firing the coated base material on a bed of granular refractory material and without agitation to fuse the glaze thereon.

10. The method of producing granular surfacing material which includes admixing a quantity of a granular base material with a vehicle carrying a glaze, removing the vehicle and firing a mass of the glaze coated material by passage thereof through a heating zone without agitation, said mass of glaze coated material being supported on a bed of previously fired glaze coated material during its passage through the heating zone.

11. The method of producing granular surfacing material which includes coating a granular base material with a vehicle carrying a fritted glaze, removing the vehicle and firing the glaze coated base material to fuse the glaze thereon on a bed of granular refractory material.

12. The method of producing granular surfacing material which includes coating a granular base material with a vehicle carrying a glaze, removing the vehicle and firing the glaze coated base material to fuse the glaze thereon on a bed of granular refractory material.

13. The method of producing granular surfacing material which includes coating a granular base material with a glaze in amount not substantially in excess of that required to coat the granules and subjecting the glaze coated granular material in a mass to a fluid heating medium at a temperature and for a time such as to fuse the glaze thereon and which is characterized by the fact that in the fusion of the glaze on the glaze coated granular material the granules are relatively immobile among themselves in the mass and further by the fact that the heating medium is mobile relative to the mass of glaze coated granules.

14. The method of producing granular surfacing material according to claim 13, characterized by the fact that the heating medium is passed through the mass of glaze coated material in the fusion of the glaze thereon.

15. The method of producing granular surfacing material according to claim 13, characterized by the fact that a fritted glaze is used for coating the granular base material.

PRESTON R. SMITH.